(12) United States Patent
Hofmann et al.

(10) Patent No.: US 8,448,062 B2
(45) Date of Patent: May 21, 2013

(54) SYSTEM AND METHOD FOR SIMULTANEOUS DISPLAY OF MULTIPLE TABLES

(75) Inventors: Helmut Hofmann, Sandhausen (DE); Markus Koenigstein, Bad Schoenborn (DE)

(73) Assignee: SAP AG, Walldorf (DE)

( * ) Notice: Subject to any disclaimer, the term of this patent is extended or adjusted under 35 U.S.C. 154(b) by 67 days.

(21) Appl. No.: 13/019,023

(22) Filed: Feb. 1, 2011

(65) Prior Publication Data
US 2011/0145690 A1 Jun. 16, 2011

Related U.S. Application Data

(63) Continuation of application No. 11/801,670, filed on May 9, 2007, now Pat. No. 7,925,989.

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/048 | (2006.01) |

(52) U.S. Cl.
USPC ........................... 715/227; 715/793; 715/853

(58) Field of Classification Search
None
See application file for complete search history.

(56) References Cited

U.S. PATENT DOCUMENTS

| | | | |
|---|---|---|---|
| 5,119,307 A | 6/1992 | Blaha et al. | 700/107 |
| 5,634,123 A * | 5/1997 | Bennion | 1/1 |
| 5,917,492 A | 6/1999 | Bereiter et al. | 715/854 |
| 5,970,506 A | 10/1999 | Kiyan et al. | 715/212 |
| 6,016,497 A | 1/2000 | Suver | 1/1 |
| 6,317,750 B1 * | 11/2001 | Tortolani et al. | 1/1 |
| 6,564,203 B1 * | 5/2003 | Krishnaprasad et al. | 707/702 |
| 6,639,611 B1 | 10/2003 | Leduc | 715/764 |
| 6,791,571 B1 | 9/2004 | Lamb | 345/619 |
| 6,948,125 B2 | 9/2005 | Detweiler et al. | 715/713 |
| 7,107,277 B1 | 9/2006 | Mitra et al. | 1/1 |
| 7,236,982 B2 | 6/2007 | Zlatanov et al. | 1/1 |
| 7,383,516 B2 | 6/2008 | Sauls et al. | 715/854 |
| 7,386,835 B1 | 6/2008 | Desai et al. | 717/117 |
| 7,774,172 B1 | 8/2010 | Yunt et al. | 703/2 |
| 2001/0047372 A1 | 11/2001 | Gorelik et al. | 707/514 |
| 2002/0191033 A1 | 12/2002 | Roberts | 345/853 |
| 2004/0205535 A1 | 10/2004 | Newman et al. | 715/509 |
| 2004/0243616 A1 * | 12/2004 | Benhase et al. | 707/102 |
| 2005/0034060 A1 | 2/2005 | Kotler et al. | 715/503 |
| 2005/0160379 A1 | 7/2005 | Roberts | 715/853 |
| 2005/0262452 A1 * | 11/2005 | Sauermann | 715/853 |
| 2006/0195780 A1 * | 8/2006 | Zuccolotto et al. | 715/503 |

(Continued)

Primary Examiner — Stephen Alvesteffer
(74) Attorney, Agent, or Firm — Kenyon & Kenyon LLP

(57) ABSTRACT

In a system and method for displaying hierarchically related data, a processor may display in a single display window of a display device respective representations of a plurality of hierarchically related data records in accordance with the hierarchical relationship, where each of at least two of the representations includes a respective table including a plurality of data columns, and where the display of some of the columns of the tables is in accordance with display settings set based on a determination that columns of different tables correspond to each other for alignment.

20 Claims, 10 Drawing Sheets

U.S. PATENT DOCUMENTS

| | | | |
|---|---|---|---|
| 2006/0242557 A1* | 10/2006 | Nortis, III | 715/509 |
| 2007/0150562 A1 | 6/2007 | Stull et al. | 709/223 |
| 2007/0192694 A1 | 8/2007 | Allor et al. | 715/713 |
| 2007/0288424 A1 | 12/2007 | Neil | 707/2 |
| 2008/0046803 A1* | 2/2008 | Beauchamp et al. | 715/212 |
| 2008/0250318 A1 | 10/2008 | Walter | 715/713 |

* cited by examiner

| | A | B | C | D | E | F | G |
|---|---|---|---|---|---|---|---|
| Table 600 | Fixed Column 601 | Fixed Column 602 | Fixed Column 603 | Fixed Column 604 | Fixed Column 605 | Fixed Column 606 | Fixed Column 607 |

| | A | B | C | D | E | F |
|---|---|---|---|---|---|---|
| Table 610 | Fixed Column 611 | Fixed Column 612 | Fixed Column 613 | Fixed Column 614 | Fixed Column 615 | Variable Column 616 |

| | A | C | D | F |
|---|---|---|---|---|
| Table 620 | Variable Column 621 | Fixed Column 622 | Variable Column 623 | Variable Column 624 |

| | A | C | E |
|---|---|---|---|
| Table 630 | Variable Column 631 | Variable Column 632 | Variable Column 633 |

| | A | D | F |
|---|---|---|---|
| Table 640 | Variable Column 641 | Variable Column 642 | Variable Column 643 |

| | A | H | D | F |
|---|---|---|---|---|
| Table 650 | Fixed Column 651 | Variable Column 652 | Variable Column 653 | Variable Column 654 |

| | A | X | Y | C | D | E | F | G |
|---|---|---|---|---|---|---|---|---|
| Table 660 | Fixed Column 661 | Fixed Column 662 | Variable Column 663 | Fixed Column 664 | Fixed Column 665 | Fixed Column 666 | Fixed Column 667 | Fixed Column 668 |

Table 1000:
| A | B |
|---|---|
| Column 1002 | Column 1004 |

Table 1001:
| A | C | B |
|---|---|---|
| Column 1003 | Column 1006 | Column 1005 |

FIG. 11

Table 1100 (Column 1102, Column 1104):
| A | B |
|---|---|
| Portion 1102.1 / Portion 1102.2 | Portion 1104.2 / Portion 1104.1 |

Table 1101 (Column 1103, Column 1106, Column 1105):
| A | C | B |
|---|---|---|
| Portion 1103.2 / Portion 1103.1 | | Portion 1105.1 / Portion 1105.2 |

FIG. 12

Table 1200 → | A | C | D | B |
Column 1202 | Column 1206 | Column 1208 | Column 1204

Table 1201 → | A | E | B |
Column 1203 | Column 1207 | Column 1205

FIG. 13

Table 1300 → | C | D | A | B |
Column 1306 | Column 1308 | Column 1302 | Column 1304

Table 1301 → | A | E | B |
Portion 1303.1 | Portion 1303.2 | | |
Column 1303 | Column 1307 | Column 1305

SYSTEM AND METHOD FOR SIMULTANEOUS DISPLAY OF MULTIPLE TABLES

CROSS-REFERENCE TO RELATED APPLICATION

This application is a continuation application of, and claims priority under 35 U.S.C. §120 to, U.S. patent application Ser. No. 11/801,670, filed May 9, 2007, the entire contents of which is hereby incorporated by reference in its entirety.

BACKGROUND

Data can be arranged in an hierarchical fashion by a logical assignment of various data elements to classes and subclasses of data. To allow a user to easily search for a particular data element, a tree structure is often displayed which can be traversed until the sought data element is found. For example, files arranged in directories and sub-directories are often represented visually in such a tree structure.

A data element presented in an hierarchical tree structure is often selectable for viewing of particular properties and attributes of the data element. For example, in response to selection of a file in the tree structure, the file may be opened in a new display window to reveal its contents. The contents may include tables of interrelated data. For example, a transaction record represented in the tree structure may include, among other tables, a table of personal data of a customer with whom the transaction was conducted. Further, it is often the case that data of one cell of a table represents another subtable. For example, a customer may be associated with multiple transactions. A cell indicating that the customer is associated with transactions may be selected to display a table including transactions data. For example, each row of the transactions data table may include data of a respective transaction record. To navigate all of the data, a user can traverse the tree structure to find a data element and select it to separately view its contents, e.g., a table of data.

Contents of different data elements presented in an hierarchical tree structure can include similar tables or table components. However, at most, conventional computer systems provide for simultaneous display of two first hierarchical level tables that are not hierarchically related to each other. Further, the extent to which conventional systems provide for a hierarchical display of records that can be expanded to display corresponding tables is limited by the constraint that the tables of a same hierarchical level are of the same structure, i.e., they include the same column types in the same order. Conventional systems do not provide for presentation of hierarchically related tables in a manner via which relationships of different tables and table components of low hierarchical level tables can be visually discerned. In particular, conventional systems do not provide for presentation of differently structured tables in a manner via which relationships of the differently structured tables can be visually discerned.

BRIEF DESCRIPTION OF THE DRAWINGS

FIG. 6 illustrates columns set as fixed or variable for alignment of corresponding columns of different tables, according to an example embodiment of the present invention.

FIG. 10 illustrates alignment of pairs of corresponding columns having a different number of intermediary columns, according to an alternative example embodiment of the present invention.

FIG. 11 illustrates partial alignment of pairs of corresponding columns having a different number of intermediary columns without alignment of column edges, according to an example embodiment of the present invention.

FIG. 12 illustrates full alignment of pairs of corresponding columns having a different number of intermediary columns, according to an example embodiment of the present invention.

FIG. 13 illustrates a width of a first column set based on maximum allowed white space and based on consideration of correspondence of another column of the same table as that of the first column with a column of another table, according to an example embodiment of the present invention.

DETAILED DESCRIPTION

Embodiments of the present invention relate to a computer system and method for improving visualization of hierarchically structured data elements by providing an expanded tree structure with a visualization of the relationship of the different data elements in the tables regardless of hierarchical level. In particular, embodiments of the present invention provide for a display of hierarchically arranged nested tables. More particularly, embodiments of the present invention provide for the display of the nested tables in a manner that accentuates the relationships of different tables and/or table components of different tables of the same or different hierarchical levels of the hierarchical structure. In an example embodiment of the present invention, for such accentuation, columns of different ones of the tables that include the same type of data may be aligned.

The computer system may include one or more computer programs written in any conventional computer language. Example computer languages that may be used to implement the computer system and method of the present invention may be Java, Extensible Markup Language (XML), C++, Structured Query Language (SQL) or other database query language, or a combination thereof. The computer program(s) may include, e.g., a plurality of routines for performance of different tasks.

Figure 1:
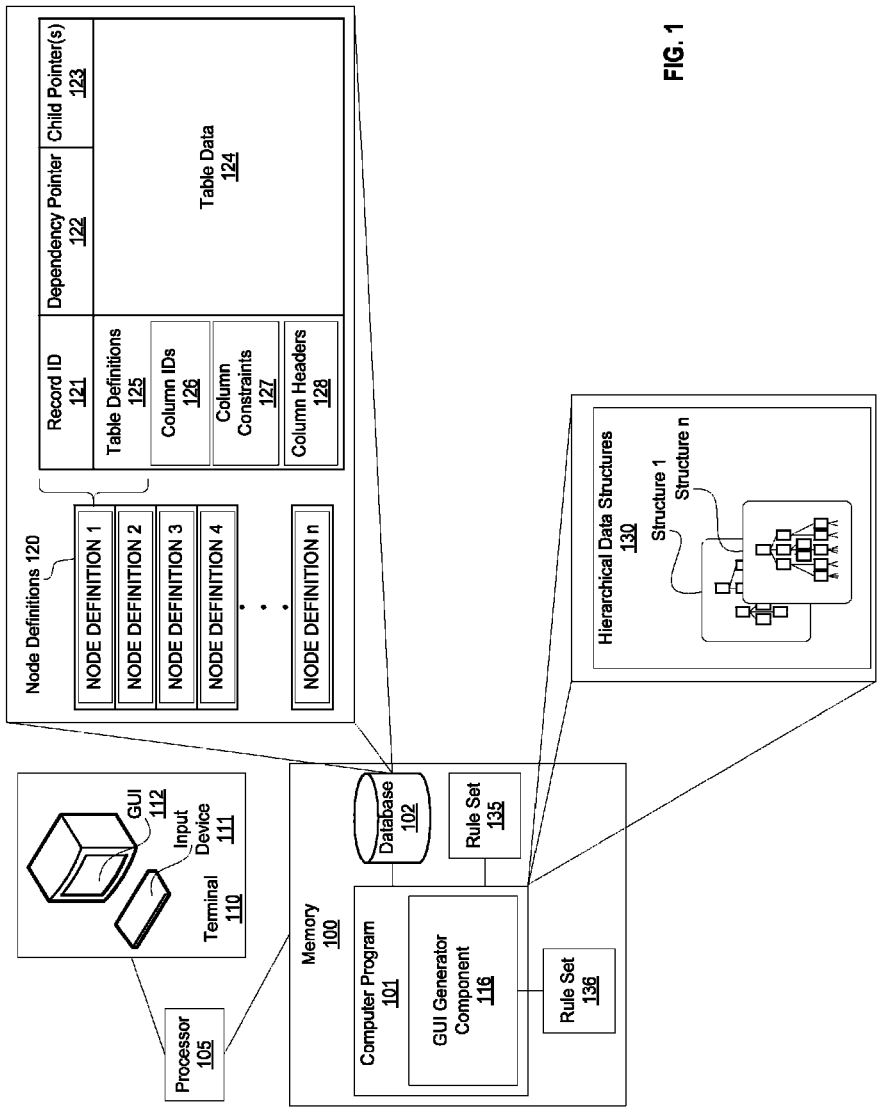
FIG. 1 is a block diagram that illustrates components of a system according to an example embodiment of the present invention.

FIG. 1 is a block diagram that illustrates example components of a system on which embodiments of the present invention may be implemented. The system may include a memory 100, which may include any combination of conventional memory circuits, including electrical, magnetic, and/or optical systems. The memory 100 may include, for example, read only memory (ROM), random access memory (RAM), and/or bulk memory.

The memory 100 may include a computer program 101 and a relational database 102. Information may be stored, e.g., relationally, in the database 102. For example, the information may be stored as a plurality of data elements. The data elements may include records associated with a plurality of further data elements that can be grouped in multiple ways. The further data elements with which the records are associated may be further records that are associated with other data elements, etc. A record's sub-records may include different record types. For example, an "expense" record may be associated with multiple transaction records, each transaction contributing to the expense record, and may be associated with multiple company records, each company contributing to the expense. The relationships between various data elements may include different kinds of cardinality. For example, cardinalities may include one to one, one to many, and/or many to many.

The relational database 102 may store the records as nodes in a data structure definition. The data structure definition may include node definitions 120, where each node is represents a record. A node definition of a particular node for which one or more tables of data may be presented may include a node ID 121, a dependency pointer 122 pointing to an immediate parent of the particular node, child pointers 123, one or more table definitions 125, and table data 124 to be presented in the columns of the table defined by the table definition 125. A record may be stored as a separate node in the node definition 120, e.g., if the record is to be presented as its own separate table. Otherwise, the record may be provided as table data of a parent node. A child pointer 123 of the particular node may be included in the particular node's node definition to another node that is a child node of the particular node having its own defined node structure, if the particular node has such a child node.

The table definition(s) 125 may include a plurality of column IDs 126, column constraints 127 such as a stipulation of a data type that may be included in the column (if there are any such constraints), and column headers 128.

The computer program 101 may include a Graphical User Interface (GUI) generator component 116. A processor 105 may execute the computer program 101 for obtaining the information or parts thereof from the database 102 and displaying, via execution of the GUI generator component 116, tables including the obtained information according to the relationships between the data elements as defined by the node definitions 120, e.g., in accordance with prescribed criteria, for example, input by a user via an input device 111, e.g., at a terminal 110. For example, the GUI generator component 116 may generate different tables according to different hierarchical data structures 130, depending on which columns defined in the node definitions 120 the user indicates should be included in the provided tables. The processor 105 may output data for causing display of the generated tables on a GUI 112 provided in a monitor screen of the terminal 110. The memory 100 may be a memory of the terminal 110 or may be, e.g., a server memory that services a plurality of terminals. For example, the information of the database 102 may include information input by multiple users via distributed devices of a network, e.g., the Internet.

The processor 105 may be any one or combination of suitably appropriate processing systems, such as, for example, a microprocessor, a digital signal processor, and a field programmable logic array. The processing system may be embodied as any suitably appropriate computing device, e.g., a computer, personal digital assistant (PDA), laptop computer, notebook computer, a hard-drive based device, or any device that can receive, send, and store data.

Figure 2:
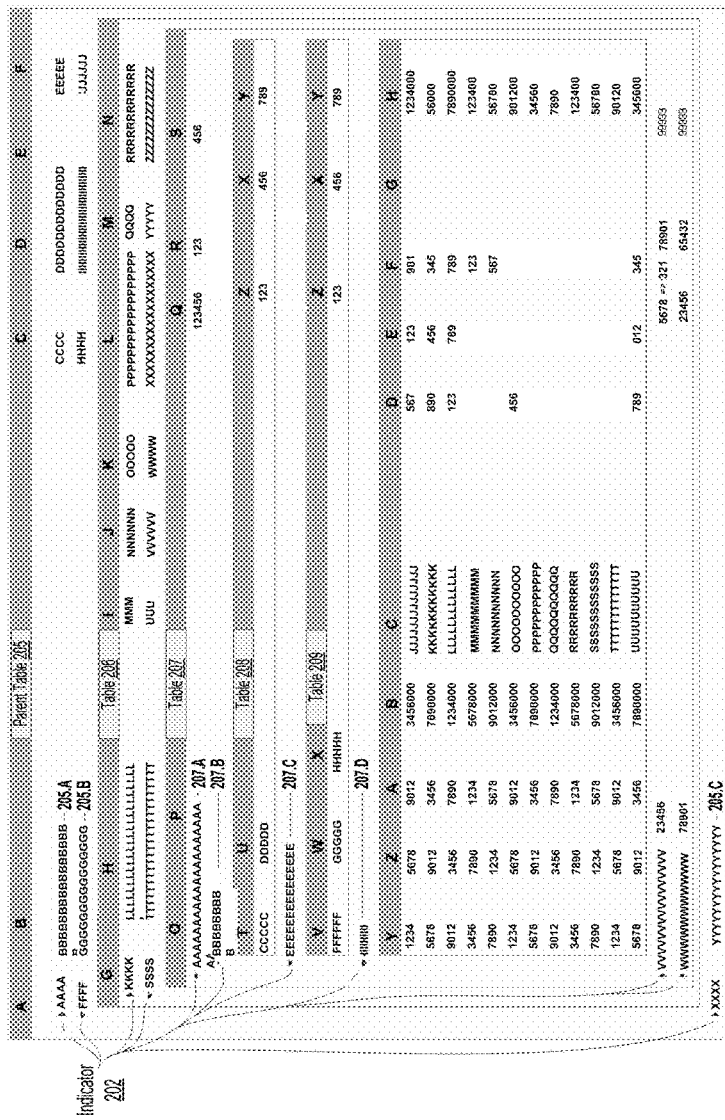
FIG. 2 is a screenshot of a display including nested tables arranged according to an example embodiment of the present invention.

FIG. 2 is a screenshot of a display the processor 105 may display on the GUI 112 via execution of the GUI generator component 116 of the computer program 101, according to an example embodiment of the present invention. The processor 105 may generate and display on the GUI 112 a plurality of tables that includes tables nested according to the hierarchy in which the data elements are stored in the database 102 and/or according to hierarchies specified for the present display, e.g., depending on user input indicating the particular constraints regarding which data to include in the display. Parts of the display may be selectable, e.g., via point and click of a mouse. For example, levels of nested tables may be expandable and collapsible via selection of records within the tables. The processor 105, via execution of the GUI generator component 130, may provide for expandable/collapsible selection of those displayed records for which a separate node definition 120 is provided. This may be determined based on the child pointers 123.

For example, in an embodiment of the present invention, the processor 105 may display a collapse/expand indicator 202, such as an arrow that indicates that the record alongside which the arrow is displayed is expandable. The processor 105 may initially display a single parent table 205 representing a highest hierarchical level that includes a plurality of records, one or more of which are expandable. In response to a selection of an expandable record, e.g., via point and click of the record or of its associated indicator 202, via keyboard entries, and/or via other input types depending on the particular input device used, the processor 105 may update the display to include another table 206, e.g., in place of or below the selected record and within the table 206's parent table(s). The newly displayed table 206 may be of a lower hierarchical level than that of the parent table 205. (Depending on the cardinality structure, the hierarchy may take on various forms, such that the roles of parent and child in one hierarchy of the database 102 may be reversed in another hierarchy of the database 102. For example, the database may include a plurality of dependency and child pointer versions, where each version is associated with a different view or context. Depending on the view selected by the user or context in which the user inputs an instruction for display of the tables, the GUI generator 116 may generate a particular hierarchical structure in accordance with the corresponding pointer version. However, further discussion regarding the nature and structures of the hierarchies is not important for an understanding of the present invention).

Figure 3:
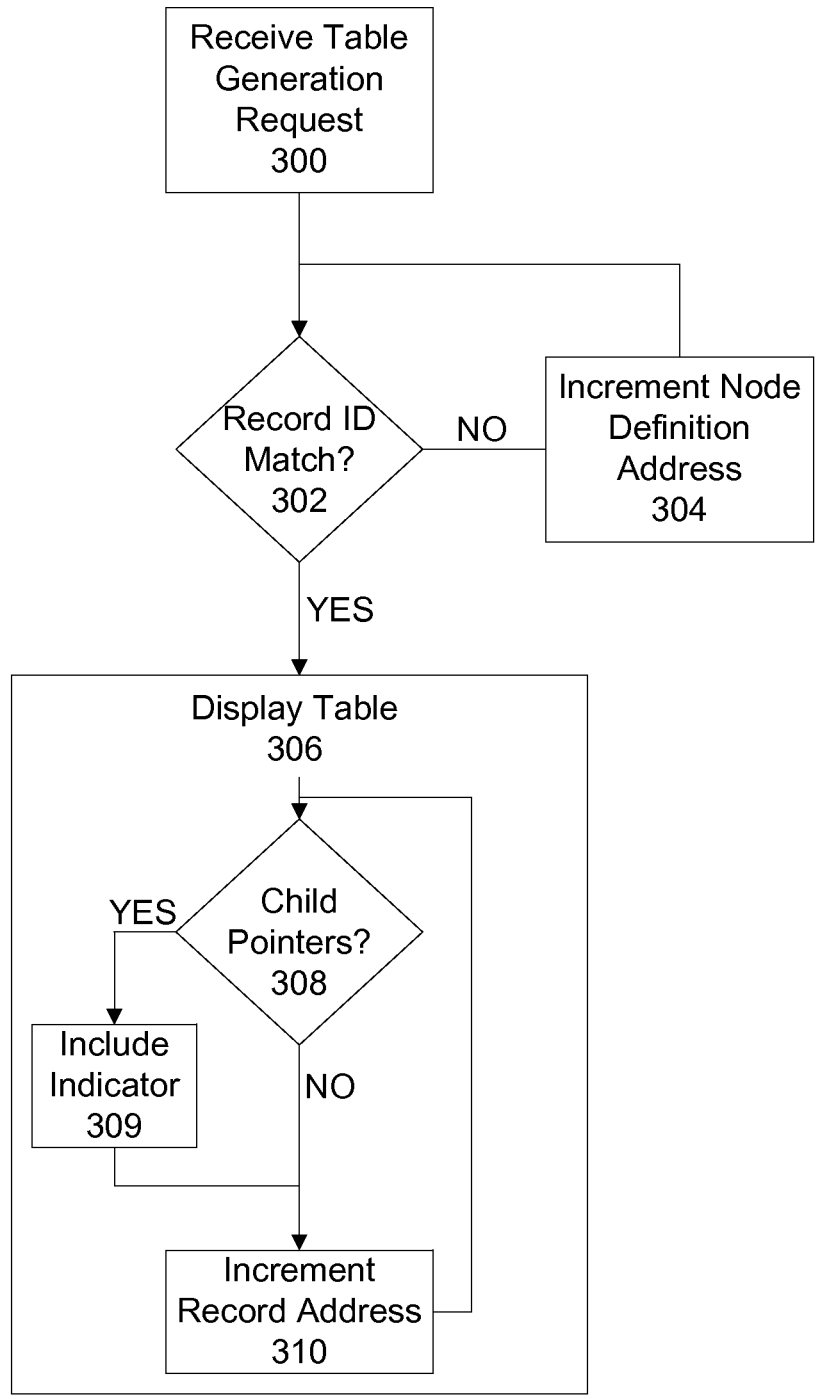
FIG. 3 is flowchart that illustrates a method that may be performed to display a plurality of hierarchically related tables with collapse/expand indicators.

FIG. 3 is a flowchart that illustrates a method that may be performed during execution of the GUI generator component 116 for generating the parent table 205 representing the highest hierarchical level. At 300, the GUI generator component 116 may receive a table generation request. In response, the GUI generator component 116 may access the database 102 and search the node definitions 120 for a node having a record ID that matches one associated with the table of the highest hierarchical level. Starting at a first address of the node definitions 120, the GUI generator component 116 may determine, at 302, whether there is a record ID match. If there is not a match, the GUI generator component 116 may, at 304, increment the node definition address by 1, and return to 302 to check the record identifier of next node definition. When a match is found, the GUI generator component 116 may, at 306, display the table defined in the node's respective table definition 125 including the respective table data 124.

For displaying the table at 306, the GUI generator component 116 may, at 308, determine, for each included record of the table(s) of the node definition 120 of the matched record ID, whether there is a child pointer 123 of the node definition 120 of the matched record ID that is associated with the particular included record. If there is such a child pointer 123, the GUI generator component 116 may, at 309, include an indicator 202 for the record. The GUI generator component 116 may then, at 310, move on to the next record if any. Otherwise, the GUI generator component may proceed to 310 without including an indicator 202. Steps 304-310 may be performed until each record of the table has been checked. The procedure of FIG. 3 may also be performed in response to each selection of an indicator 202, i.e., the selection may be interpreted as a table generation request.

In one example embodiment of the present invention, in response to the input indicating an instruction to expand a record, the system and method of the present invention may display a table of a hierarchical level that is one level lower than that of the table to which the record selected for expansion belongs, e.g., so that the user can easily follow the progression through the data hierarchy. The newly displayed table may include further expandable records initially displayed in a collapsed state. In an alternative embodiment, in response to expansion of a record of a table of a highest hierarchical level, records of all lower hierarchical levels may be displayed initially in an expanded state so that the user is provided with all information of the data hierarchy associated in a single hierarchical branch with the record selected by the user.

In one example embodiment of the present invention, the processor 105 may display the arrow indicators 202 pointing in different directions, depending one whether the associated records have been expanded. For example, the processor 105 may display an arrow pointing towards the right side of the GUI 112 to indicate that the associated record is in a collapsed state and an arrow pointing downwards to indicate that the associated record is in an expanded state. In response to an instruction to expand a record, the processor 105 may insert within the table to which the record belongs a child table associated with the record and may change the direction of the arrow.

The number of nesting levels of tables that originate from a root table and that are displayed by the processor 105 may depend on the particular hierarchical structure of the database 102 followed by the processor 105. For example, FIG. 2 illustrates tables nested down to a fourth hierarchical level. However, further levels are possible depending on the given hierarchy. In one example embodiment of the present invention, the number of different levels of tables simultaneously displayed on the GUI 112 may be limited only by the size of the GUI 112.

In an example embodiment of the present invention, the user may select any displayed record's indicator 202. In response to the selection, the system and method may display the record's associated table, while maintaining the previous collapsed/expanded state of all other records displayed prior to the user selection. Thus, particular expandable records of a particular table may be displayed in an expanded state while other records of the particular table are simultaneously displayed in a collapsed state. For example, with respect to table 205, record 205.B is shown displayed in an expanded state, while records 205.A and 205.C are shown displayed in a collapsed state. The expanded record including a table with one or more records may be displayed between other records, including expanded and collapsed records, of the table to which the expanded record belongs. More than one record may be displayed simultaneously in an expanded state. For example, after performing the procedure described with respect to FIG. 3 for a first record of a low hierarchical level, the GUI generator component 116 may receive another table generation request with respect to a second record of a low hierarchical level, e.g., on a different hierarchy branch than that of the first record. In response to the new request, the GUI generator component 116 may update a previously generated display to include a new table corresponding to the second record for nested display in a parent table without removing the previously provided table of the first record from the display.

The present invention accommodates nested tables that have different structures. For example, a non-exhaustive list of differences may include differences with respect to a number of included columns, data categories to which the columns correspond, data types included in the columns, and/or the order in which the tables' respective columns appear. For example, the respective structures of tables 205 and 206 are shown to be different at least with respect to the number of included columns and the particular data categories for which corresponding columns are provided.

The tables having different structures may be of different hierarchical levels and/or of the same hierarchical level. With respect to records of the same hierarchical level having different table structures, the records may be of the same or different tables. For example, records 207.C and 207.D, which are of the same hierarchical level and which belong to the same table, i.e., table 207, are shown as being expanded to tables having different structures. Moreover, a single record may be expanded to display a plurality of differently structured tables. A record may include sub-records expandable to differently structured tables or may be expanded to display differently structured tables, for example, where, respectively, the sub-records of the record include different record types, or where the tables include records of different types. For example, an "expense" record may be associated with multiple transaction records, each transaction contributing to the expense record, and may also be associated with multiple company records, each company contributing to the expense.

The tables having different structures, whether of the same or different hierarchical levels and whether of the same or different immediately preceding parent tables, may be simultaneously displayed.

In an example embodiment of the present invention, different records of a same hierarchical level may be expanded to a different number of sub-hierarchical levels. For example, a first record of a particular hierarchical level may be fully expanded to a number of sub-hierarchical levels that correspond to a first number, i.e., first with respect to hierarchical sequence, of sub-hierarchical levels of a second record of the particular hierarchical level, so that the last of all of the sub-hierarchical levels of the first record may correspond to the last one of the first number of sub-hierarchical levels of the second record, although the second record may be further expanded to a second number of sub-hierarchical levels of lower hierarchical level than that of the last one of the first number of sub-hierarchical levels.

A first record expandable to fewer hierarchical levels than a second record, e.g., of the same table as that of the first record, may be missing tables corresponding to tables of intermediate ones of the hierarchical levels of the second record, but may include tables corresponding to tables of hierarchical levels of the second record that are higher and lower than the intermediate hierarchical levels. For example, a first record may represent a company headquarters in charge of facilities throughout a country. A first sub-hierarchical level of the first record may include records representing managers of facilities in various regions of the country, each region including a number of states. A second sub-hierarchical level, which is a sub-hierarchical level of the records of the first sub-hierarchical level, may include records representing managers of facilities in particular ones of the states of the regions represented by their respective parent records. By contrast, a second record may represent another company headquarters in charge of facilities throughout the country. A first sub-hierarchical level of the second record may include records representing managers of facilities in particular states of the country. A hierarchical level including records representing managers of facilities in regions of the country may be omitted with respect to the second record. Thus, although tables may be of different hierarchical levels, they may be associated with each other. Their simultaneous display may aid the user in discerning the tables' associations with each other.

Figure 4:
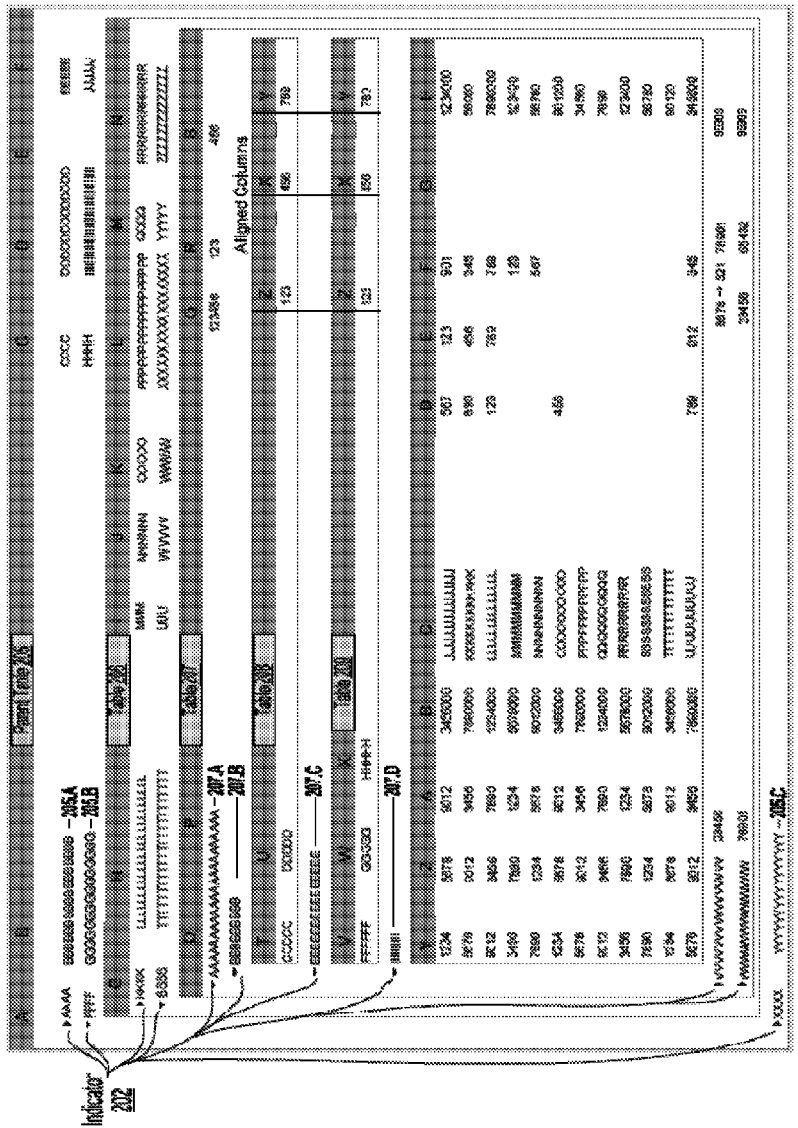
FIG. 4 is a screenshot of a display that identifies alignment of corresponding columns of different tables, according to an example embodiment of the present invention.

Even where different tables that are logically associated with each other are simultaneously displayed, it can nevertheless be difficult for the user to visually comprehend the logical data associations, in particular where the tables are not separated from each by other records or where the tables are of different hierarchical levels. In an example embodiment of the present invention, a plurality of tables may be displayed simultaneously in a manner that accentuates relationships between data of the plurality of tables. For such accentuation, columns of different ones of the tables that include data determined to be associated with each other may be aligned. For example, FIG. 4 is a screenshot of a display similar to the screenshot of FIG. 2, but further indicates where columns of tables 208 and 209 have been aligned according to an example embodiment of the present invention. Whether columns of different tables are determined to be associated with each other by the GUI generator component 116 may depend, for example, on the different column IDs 126, column headers 128, and/or column constraints 127, as provided in a rule set 136, as explained below.

According to an example embodiment of the present invention, columns of a plurality of tables of a single record determined to be associated with each other may be aligned. According to a further embodiment of the present invention, even columns that are of a plurality of simultaneously displayed tables of different corresponding records of an immediate parent record's table, and that are determined to be associated with each other may be aligned. According to a further embodiment of the present invention, even columns that are of a plurality of simultaneously displayed tables of different corresponding records of tables of different immediate parent records and that are determined to be associated with each other may be aligned. According to a further embodiment of the present invention, even columns that are of a plurality of simultaneously displayed tables of different hierarchical levels of a data tree and that are determined to be associated with each other may be aligned.

In one example embodiment of the present invention, columns of different tables may be determined to be associated with each other if the columns are assigned the same column header 128. For example, a rule set 135 used by the computer program 101 for storing data in the database 102 may provide that for a particular table, each column must be assigned an ID unique with respect to other columns of the same table, but that the columns of different tables may be assigned the same column header 128.

In an alternative example embodiment of the present invention, columns of different tables may be determined to be associated with each other if the columns are assigned the same column ID 126. For example, the rule set 135 used by the computer program 101 for storing data in the database 102 may provide that for a particular table, each column must be assigned an ID unique with respect to other columns of the same table, but that columns of different tables may be assigned the same ID. Unlike a column header, the column ID may be metadata that is not displayed by the GUI generator component 116 in response to a table generation request. Initially when entering the table data to be eventually included in the table display, or when updating the data, the user may assign the column IDs based on the user's determination that there is a relationship between different tables' columns.

Use of column IDs instead of column headers may be advantageous because columns having categorically different data nevertheless may have a relationship to each other. Thus, the column IDs may be used for associating the columns to each other for purposes of alignment. The association for purposes of alignment may be performed so that a relationship between the columns' respective data may be visually discerned. For example, a table of a first hierarchical level may include a "net worth" column in the cells of which are included data indicating a respective record's associated company's net worth. Tables of lower hierarchical levels, which may be displayed by expanding the records of the first hierarchical level, may include a table having a column that includes cells, data of which indicate a particular asset value, and a table having a column that includes cells, data of which indicate a particular debt. The assets and debts may bear a relationship to the overall net worth represented in a record of the parent table. Accordingly, although the data represented in each of the tables may be categorically different, they may nevertheless bear a relationship for which a visual indication may be beneficial and may be provided based on shared column IDs according to an example embodiment of the present invention.

In an alternative example embodiment of the present invention, other factors in addition to or instead of column ID may be taken into account for determining an association between columns of different tables. For example, the rule set 136 may provide that the GUI generator component 116 is to examine definitions of a data type of columns within different tables to identify a relationship between the columns. For example, data defining a number format (e.g., representing dollar amounts) may cause the columns to be considered related even if the column headings and/or IDs do not indicate a relationship. The columns determined to be related may be aligned, which may contribute to a display that is more easily reviewed by the user.

In one example embodiment, the system and method of the present invention may provide for alignment of only those columns that include data in a number format. In particular, the system and method may provide for alignment of only those columns that include data in a particular number format type, e.g., a dollar amount format. More particularly, the system and method may provide for alignment of only those columns dedicated to inclusion of, e.g., only, data that is in the number format. Whether a column satisfies these conditions may be discerned by checking the table data 124 of the column and/or the column constraints 127 of the column.

Alternatively or additionally, the system and method of the present invention may provide for manual association by a user between columns of different tables, regardless of an assignment of identical IDs or the inclusion of similar data types. For example, the GUI generator component 116 may generate a set-up page with a set of drop-down boxes presented in an hierarchy based on the dependency and child pointers 123 of the node definitions 120. The drop-down boxes may each correspond to a respective table and may include a list of column names of the respective table. The user may select a column header name and, e.g., drag and drop it on another drop-down box from which the user may select a column header name of the column with which the user desires an association to the dragged column header name. In response to the drag-and-drop, the GUI generator component 116 may access the database 102 to update the table definition 125 of the node corresponding to the dragged table and the node corresponding to the table at which it was dropped to include a pointer associated with each of the selected columns to the other selected column. Alternatively, for a displayed column, the user may otherwise input instructions identifying a particular table and column with which to associate the displayed column. Any other suitably appropriate method of inputting instructions may be used for manual association between columns.

The particular conditions that must be satisfied for columns of different tables to be considered as being associated with each other for alignment may be stored in the rule set 136. For each column to be displayed, the GUI generator 116 may determine whether the column satisfies each condition of the rule set 136.

Figure 5:
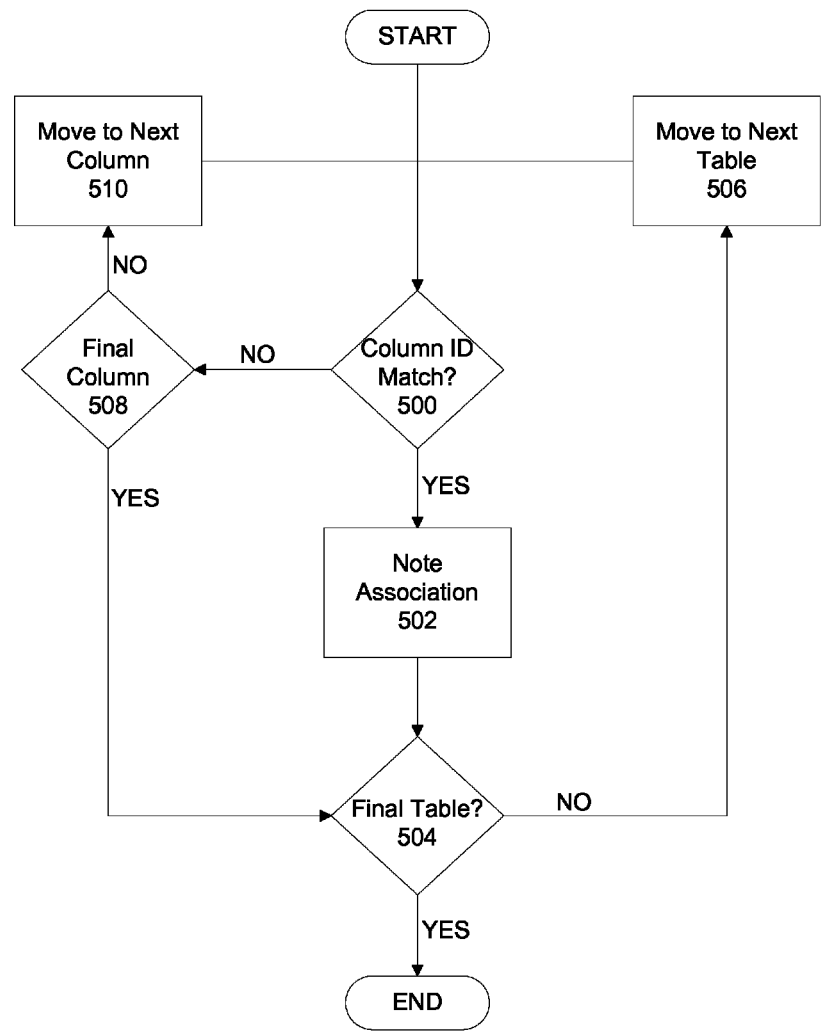
FIG. 5 is a flowchart that illustrates a method that may be performed to determine whether columns of a table are associated with columns of other tables for column alignment, according to an example embodiment of the present invention.

FIG. 5 is a flowchart that illustrates a method that may be performed by the GUI generator component 116 to set a column to be displayed as being one that corresponds for alignment with a column of another table. At 500, the GUI generator component 116 may compare the column's ID with a column ID of another table to be included in the display to determine if there is a match. (Which other tables are to be included in the display may depend on which records were selected for expansion by the user.) If there is a match, the GUI generator component 116 may, at 502, store an indication that notes the association of the column with the column of the other table. After noting the association, the GUI generator component 116 may, at 504, determine if the table in which the corresponding column was found is the last of the tables to be included. If there are other tables, the GUI generator component 116 may, at 506, move on to the first column of the next table to be displayed, and repeat the steps starting at 500 with respect to the first column of the next table.

If it is determined at 500 that there is no match, the GUI generator component 116 may, at 508, determine whether the previously checked column is the least of the columns of the table. If it is not the last column, the GUI generator component 116 may, at 508, move on to the next column of the table and repeat the steps starting at 500 with respect to the next column. If it is determined at 508 that the checked column is the last column, the GUI generator component 116 may perform 504. Steps 500 to 504 may be performed until it is determined at 504 that the previously checked table is the last of the tables to be displayed.

As indicated above, whether columns of different tables correspond for alignment may depend on satisfaction of additional or different conditions than matching column ID. For each condition, the GUI generator component 116 may determine whether a column satisfies the condition and store a flag indicating whether the condition has been satisfied. If all flags are set indicating that the column satisfies the condition. If all flags are set indicating satisfaction of all of the conditions, the GUI generator component 116 may generate the tables so that the columns satisfying the condition are aligned with the columns indicated to be ones to which the column corresponds for alignment.

In an example embodiment of the present invention, for arrangement of columns to provide for alignment between tables, the system and method may set a column width as either fixed or variable. A fixed column width is one that is based on the respective column's data, associations for alignment with columns of other tables, and/or rules of the rule set 136 regarding permissible column widths for a column. A variable column width is one that is based at least on a remaining space available to neighboring columns or to the respective column's table's edge after setting a position and width of the neighboring columns and/or after setting edges of the respective column based on correspondence for alignment of the respective column with a column of another table.

A column's width may be set as variable if at least one of three conditions of the rule set 136, hereinafter referred to as condition 1, condition 2, and condition 3, is met. With respect to condition 1, a width of a first column of a first table may be set as variable if the first column corresponds for alignment with a first column of a second table and is positioned to an immediate left of a second column of the first table that is designated for alignment with a second column of the second table, and the first column of the second table is separated from the second column of the second table by an intermediate column. With respect to condition 2, a width of a first column of a first table may be set as variable if the first column does not correspond for alignment with any column of any other table and is positioned to an immediate left of a second column of the first table that is aligned with a column of another table. With respect to condition 3, a width of a first column of a first table may be set as variable if the first column corresponds for alignment with a first column of any other table and is a right-most of all aligned columns of the first table, and the first column of any of the other tables to which the first column of the first table corresponds is positioned to the left of more columns than is the first column of the first table. For a column that does not meet any of the three conditions, the column may be assigned a fixed width.

The three conditions are exemplary. In alternative embodiments of the present invention, columns may be set as variable upon satisfying additional or alternative conditions. For example, condition 1 may be expanded to include setting as variable a width of a first column of a first table if the first column of the first table corresponds for alignment to a first column of a second table and is separated from a second column of the first table that is the first one of the columns to the right of the first column of the first table that correspond for alignment to any column of the second table by fewer columns than are the first column of the second table and the column of the second table to which the second column of the first table corresponds for alignment. For example, with respect to FIG. 12 (which does not illustrate implementation of this variant condition 1 for assigning a variant width), column 1203 satisfies this variant condition 1. In one alternative example embodiment of the present invention, only a column to the immediate left of a left most one of the columns of the table that corresponds for alignment with a column of another table is set as a variable width column.

FIG. 6 shows assignments of either variable or fixed widths to columns of a plurality of tables, where the assignments are determined based on whether any of the three conditions is met.

The width of column 623 is set as variable since column 623 satisfies condition 1. In this regard, column 623 corresponds for alignment with column 614 and is positioned to the immediate left of column 624 which corresponds for alignment with column 616 which is separated from column 614 by intermediate column 615. The widths of columns 621, 631, 632, 641, 642, and 653 are similarly set as variable since these columns satisfy condition 1.

The width of column 652 is set as variable since column 652 satisfies condition 2. In this regard, column 652 does not correspond for alignment with columns of any of the other tables 600-660 and is positioned to the immediate left of column 653 which corresponds for alignment with columns 604, 614, 623, 642, and 665. The width of column 663 is similarly set as variable since this column satisfies condition 2.

The width of column 616 is set as variable since column 616 satisfies condition 3. In this regard, column 616 corresponds for alignment with columns 606, 624, 643, 654, and 667. Column 616 is a right-most of all aligned columns of table 610, and columns 606 and 667 are each positioned to the left of more columns than is column 616. The widths of columns 624, 633, 643, and 654 are similarly set as variable since these columns satisfy condition 3.

The widths of the remaining columns 601-607, 611-615, 622, 651, 661-662, and 664-668 are set as fixed since these columns do not satisfy any of the three conditions.

Figure 7:
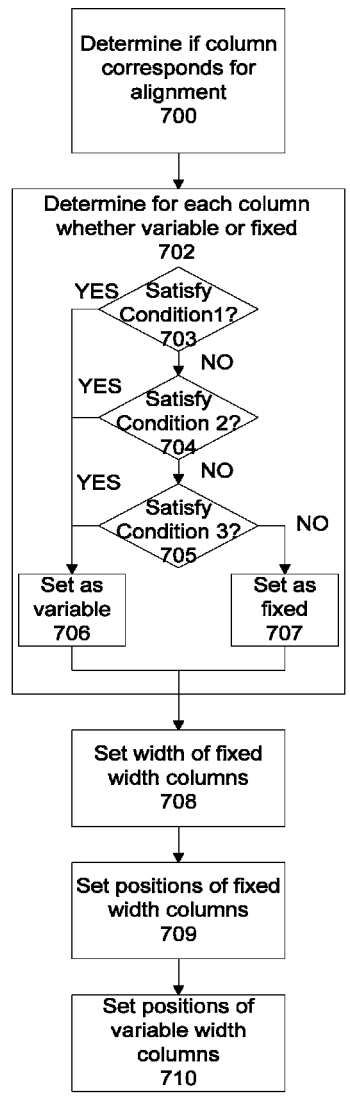
FIG. 7 is a flowchart that illustrates a method that may be performed to arrange columns in a display, according to an example embodiment of the present invention.

FIG. 7 illustrates a method for arranging a display of columns in which corresponding columns may be aligned, according to an example embodiment of the present invention. The system and method may initially, at 700, determine whether the column corresponds for alignment with a column of another table. For example, the method described with respect to FIG. 5 may be performed at this point. However, additional conditions besides for matching column ID may also be considered, such as data type of the column. Furthermore, as discussed in detail below, table display constraints, in particular in view of association for alignment between other columns may impact whether the GUI generator component 116 sets a column as corresponding for alignment with other columns. Accordingly, after setting a tentative indication that columns correspond for alignment with columns of other tables, the system may determine for a first column having a tentative indication that it corresponds for alignment with another column whether the indication should be finalized based on the tentative indications of other columns.

After determining, for each of the columns to be displayed, whether the column corresponds for alignment with a column of another table, the system may, at 702, determine for each column whether the column's width should be set as variable or fixed, e.g., by determining whether the column satisfies any of the three conditions. For example 702 may include 703-707.

At 703, the system may determine whether a column satisfies condition 1. If it satisfies condition 1, the system may, at 706, set the column's width as variable. If it does not satisfy condition 1, the system may, at 704, determine whether the column satisfies condition 2. If it satisfies condition 2, the system may proceed to 706. Otherwise, the system may, at 705, determine whether the column satisfies condition 3. If it satisfies condition 3, the system may proceed to 706. Otherwise, the system may, at 707, set the column width as fixed.

After the determination whether to set the column width as fixed or variable is made for each column, the system and method may, at 708, set, for each fixed width column, the column's width to the lesser of (a) the maximum allowed column width and (b) the width required for display of all of the data of the cell(s) of the column (and all corresponding columns of other tables if any) that includes the greatest amount (with respect to required display space) of data. In an alternative example embodiment, 708 may be performed during 702 after each determination that a column should be fixed.

After the widths of the fixed width columns are set, the system and method may set the positions for each column. For setting the columns' positions, the system and method may, at 709, set positions for the fixed width columns of all of the tables and may then, at 710, set positions for the variable width columns of all of the tables. To set the positions of the fixed width columns of a table, the system and method may begin with the right-most fixed width column of the table and move onwards towards the left of the table.

To set the position of a fixed width column, if the column is a right-most column of the table, its right edge may be set at the right edge of the table. Its left edge may be set at a position that is at a distance from the column's right edge that corresponds to the column's set column width.

If the fixed width column is not the right-most column of the table and the position of the left edge of the column to its immediate right has been set, its right edge may be set at the left edge of the column to its immediate right. Its left edge may be set at a position that is at a distance from the column's right edge that corresponds to the column's set column width.

If the fixed width column is not the right-most column of the table and the position of the left edge of the column to its immediate right has not been set, its left edge may be set at the first column position for fixed width columns of the table if it is the left-most fixed width column of the table. The first column position may be tentatively set in accordance with a display area determined by the equation $$\left[ (max * var\_width\_col\_no) + (max * var\_width\_cond1\_no) + \left( max * \sum_{n=0}^{x} no\_right\_cor\_col\_cond3(n) \right) + \sum_{n=0}^{m} \text{width of fixed\_width\_col}(n) \right],$$

where max is the maximum width of all of the tables' fixed columns' widths, var_width_col_no is the number of columns of the table that are variable, var_width_cond1_no is the number of columns of the table that satisfy condition 1, no_right_cor_col_cond3($n$) is the number of columns to the right of a column that corresponds to the variable column 'n' of the table satisfying condition 3 and that is of a table having the most number of columns to the right of any table's column corresponding to the column 'n,' x is the number of columns of the table satisfying condition 3, and m is the number of fixed width columns of the table. Once the tentative display area is determined, the left edge of the fixed column may be positioned at a distance from the first column position of the table that equals ([max] *[number of columns to the fixed width column's left]). Its right edge may be set at a position that is at a distance from the column's left edge that corresponds to the column's set column width.

The calculated display area may be larger than actually necessary. In one example embodiment of the present invention, subsequent to positioning of all of the columns, the system and method may adjust the positioning to provide a smaller display area. In an alternative embodiment, the larger display area may be maintained. In another alternative embodiment, instead of applying 'max' as the width for all of the variable width columns of the table, the calculation of the display area and the portion of the display area required to the left of the fixed column to be positioned may be fine tuned to the particular fixed column widths of the fixed columns on which are based the widths of the variable width columns of the table.

If the fixed width column is not the right-most column of the table, the position of the left edge of the column to its immediate right has not been set, the fixed width column is not the left-most fixed width column of the table, and the column corresponds for alignment with a column of another table the position of the left edge of which has already been set, its left edge may be set at the horizontal location of the display corresponding to the horizontal location of the set left edge of the column to which the fixed width column corresponds for alignment. Its right edge may be set at a position that is at distance from the column's left edge that corresponds to the column's set column width.

If the fixed width column is not the right-most column of the table, the position of the left edge of the column to its immediate right has not been set, the column is not the left-most fixed width column of the table, and the column does not correspond for alignment to a column of another table the position of the left edge of which has already been set, the system and method may seek a next column to the left of the fixed width column which is itself fixed and which corresponds for alignment with a column of another table the position of the left edge of which has been set or which is the left most fixed width column of the table. If such a next column is found, the system and method may set the position of the found column. The system and method may then set, based on assigned widths, all fixed width columns that consecutively follow the found column to the right of the found column without interruption by variable width columns. If there are only variable columns to the left of the fixed width column or if there is a variable width column between the found column and the fixed width column, the system and method may interrupt setting a position for the fixed width column, and move on in the table to the left of the found column to the next fixed width column for which positions have not yet been set, if any. If positions of any of the fixed width columns to the left of the found column can be set as described above, the system and method may do so. Once all of the fixed width columns of the table, the positions of which can be set as described above, have been set, the system and method may interrupt setting the positions of the fixed width columns of the table and move on to setting fixed width columns of following tables.

After performing these steps for all of the tables, the system and method may return to the tables including fixed width columns for which positions were not determined in the previous loop through the method and attempt to set the positions of the fixed width columns for which positions were not previously set. The loop may be repeated until the positions of all of the fixed width columns have been set.

After all of the positions are set for all columns having fixed column widths, the system and method may set the positions of the columns having variable column widths. The system and method may begin at the right most column of a table and continue towards the left. If a variable width column is a right most column of a table, the system and method may set its right edge at the right edge of the table. If the variable width column is not a right most column of the table, the system and method may set its right edge at a left edge of the column to its immediate right.

With respect to the left edge of the variable width column, if the column to the immediate left of the variable width column is a fixed width column, the system and method may set the left edge of the variable width column at the right edge of the fixed width column to the immediate left of the variable width column.

If the column to the immediate left of the variable width column is itself a second variable width column, then the first variable width column is variable for the reason that it satisfies either condition 1 or condition 3, i.e., the first variable width column corresponds for alignment with a column of at least one other table. (The first variable width column does not satisfy condition 2, since, if it did, the column to its immediate left would have been fixed.) Accordingly, the system and method may search other tables for a column to which the first variable width column corresponds for alignment and the left edge of which had been previously set. For example, the column of the other table may be a fixed width column, the position of which had been set prior to setting of the variable width columns, or may be another variable width column the left edge of which has been set, e.g., based on the right edge of a fixed width column to its immediate left or based on another previously set column to which the other variable width column corresponds.

In one example embodiment of the present invention, if the variable width column is a left most column of the table and does not correspond for alignment with a column of any other table, the system and method may postpone setting the position of the left edge of the variable width column until after positions of left edges of all of the columns of all of the tables, but for left most variable width columns, have been set. At this point, a first column position of each table may be determined In an alternative example embodiment of the present invention, the system and method may postpone setting the position of the left edge of the variable width column until after positions of the left edges of all of the columns of all of the tables of the same hierarchical level as that of the table to which the variable width column belongs, but for the left most variable width columns, have been set. According to this alternative, tables of different hierarchical may have different column starting positions, at least if first columns of tables of different hierarchical levels do not correspond for alignment. In an alternative example embodiment of the present invention, each table may have its own defined first column starting position. According to this alternative, if a first column of a table is a variable width column that does not correspond for alignment with any other column, the system and method may set a width for the column as the lesser of (a) the predetermined maximum allowed column width and (b) the width required for simultaneous display of all of the data of the cell(s) containing the greatest amount (with respect to required display space) of data of all of the cells of the column. The left edge of the variable width column may be set in accordance with the determined width. In an alternative example embodiment of the present invention, condition 2 may be limited to only those columns that are not left most columns of their respective tables, in which case the column's position would be set as described above with respect to fixed width columns.

An example implementation of some of the features of the method described above may be described with respect to FIG. 6. With respect to FIG. 6, after determining for each column whether the column is a variable or fixed width column and setting the widths of the fixed width columns, the system and method may begin to set positions of the columns of table 600. Since all of the columns of table 600 are fixed width columns, their positions may be set during an initial pass through the method. The system and method may then proceed to column 615 of table 610, since it is the right most fixed width column of table 610. To set the column's position, the system and method may set the left edge of column 615 to the same horizontal position of the left edge of column 605. The right edge of column 615 may be set to the position at a distance from the column's left edge that corresponds to the column's set fixed distance. The rest of the columns of table 610 to the left of column 615, which are all fixed width columns, may be set based on the position of each column's neighboring column to the right.

The system and method may then set the position of column 622 of table 620 in accordance with the position of the left edge of column 613 of table 610. The position of column 651 of table 650 may be set in accordance with the position of the left edge of either of columns 601 and 611. The system and method may then set the positions of columns 668-664 since they are all fixed width columns and are the right most columns of table 660. The system and method may then set the position of column 661 based on the position of the left edge of any of columns 601, 611, and 651. After setting the position of column 661, the system and method may set the position of column 662 so that its left edge is at the right edge of column 661.

The positions of all of the fixed width columns having been set, the system and method may begin setting positions of the variable width columns. The right edge of column 616 may be set at the right edge of table 610. The left edge of column 616 may be set at the right edge of column 615. The right edge of column 624 may be set at the right edge of table 620. The left edge of column 624 may be set at the same horizontal position as that of either of columns 606 and 616. The right edge of column 623 may be set at the left edge of column 624. The left edge of column 623 may be set at the right edge of column 622. The right edge of column 621 may be set at the left edge of column 622. The left edge of column 621 may be set at the same horizontal position as that of the left edge of either of column 601 and column 611.

With respect to table 630, the positions of columns 633-631 may be similarly set based on, e.g., the positions of columns 615, 613, and 611, respectively. With respect to table 640, the positions of columns 643-641 may be similarly set based on, e.g., the positions of columns 616, 614, and 611, respectively. With respect to table 650, the positions of columns 654 and 653 may be similarly set based on, e.g., the positions of columns 616 and 614, respectively. The position of column 652 may be set based on the positions of columns 653 and 651. With respect to table 660, the position of column 663 may be set based on the positions of columns 664 and 662.

In an alternative example embodiment of the present invention, the system and method may initially set positions of columns of each table without consideration of positions of corresponding columns of other tables. During the initial positioning, a temporary column width, e.g., a predetermined minimum column width, may be assigned to variable width columns of the table. After positioning of all of the columns of all tables, column positions may be adjusted based on inter-table column correspondence.

In an alternative example embodiment of the present invention, the widths of all tables that correspond for alignment with columns of other tables may be set as fixed. For example, setting of a variable column width may be limited to those columns satisfying condition 2.

According to this embodiment, if a first column of a first table satisfies condition 1, i.e., (a) it corresponds for alignment with a first column of at least one second table and is positioned to the left of a second column that corresponds for alignment with a second column of the at least one second table, and (b) the at least one second table includes more intermediate columns between its respective first and second columns than does the first table, the width of the first column of the first table may be set as fixed. To determine its width, the system and method of the present invention may determine which of the at least one second table includes the most intermediate columns. The width may then be set based on a width required for display of the contents of each of the first columns of the first table and any other tables' corresponding first columns plus the widths of each of the intermediate columns of the table determined to include the most intermediate columns. For example, referring to FIG. 6, the width of column 621 may be set as fixed. Its width may be set to be wide enough to simultaneously display all of its contents and all of the contents of each of columns 601, 611, 631, 641, 651, and 661, plus the width of column 602 or 612 which are each an intermediate column separating, respectively, columns 601 and 603, and columns 611 and 613, where columns 603 and 613 correspond for alignment with column 622.

According to this embodiment, if a first column of a first table satisfies condition 3, i.e., it corresponds for alignment with a first column of at least one second table, is a right-most of the first table's aligned columns, and one or more of the at least one second table includes additional aligned columns to the right of its respective first column, the width of the first column of the first table may be set as fixed. To determine its width, the system and method of the present invention may determine which of the at least one second table includes the most aligned columns to the right of its respective first column. The width of the first column of the first table may then be set based on its contents and the contents of the corresponding columns of the other tables plus the widths of all of the aligned columns to the right of the first column of the one of the at least one second table including the most aligned columns to the right of its respective first column. For example, referring to FIG. 6, the width of column 633 may be set as fixed. Its width may be set based on the size of its contents and all other columns 'E' plus the widths of either columns 605-607 or 666-668.

In one example embodiment of the present invention, alignment of columns of different tables may be limited to different tables having the same or similar structure, e.g., having the same number of columns, same data categories to which the columns correspond or same column IDs, and/or same order in which the tables' respective columns appear. For example, tables 208 and 209 of FIG. 4, the columns of which are aligned, include the same number of columns, having the same column headers, ordered in the same way. According to this embodiment, columns of different tables that are aligned with each other may be set to a same column size. For example, the column width of all columns of a set that are aligned with each other may be set based on a largest data string included in the cells of all of the set of columns combined.

In an alternative example embodiment of the present invention, columns of tables having different column structures may also be aligned. However, the extent of implementable column alignment between non-similarly structured tables may be limited as detailed below.

Figure 8:
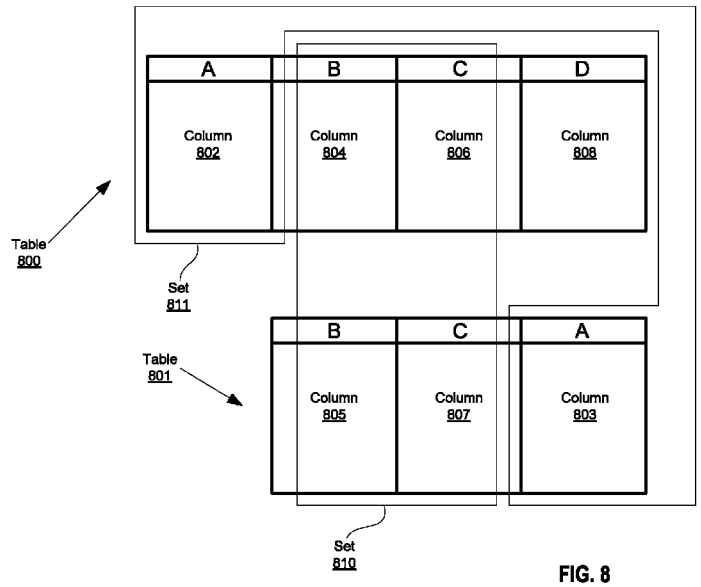
FIG. 8 illustrates selective alignment of some of a plurality of columns arranged in different orders in different tables, according to an example embodiment of the present invention.

According to this embodiment, it may occur that two tables include more than one pair of columns associated with each other for alignment and that the tables' respective columns belonging to the column pairs occur in different orders. For example, referring to FIG. 8, column 802 of table 800 and column 803 of table 801 are assigned a same column ID (or column header) 'A' and column 804 of table 800 and column 805 of table 801 are assigned a same column ID 'B'. However, the column A and B of the different tables 800 and 801 appear in reverse order. In this instance, according to an example embodiment of the present invention, one of the pairs of the associated columns may be aligned, while the other pair may remain unaligned as shown in FIG. 4.

The rule set 136 according to which the system and method of the present invention align columns of different tables may provide for maximizing the number of columns that are aligned with corresponding columns of another table. For example, columns of different tables that are associated with each other with respect to alignment, e.g., where they share IDs, may be arranged in different sequences by the node definitions 120. The out-of-sequence column pairs may include sets of in-sequence column pairs. Further, the different in-sequence column pair sets may include different numbers of column pairs. In this instance, the rule set 136 may provide that the set having the larger number of in-sequence column pairs is to be aligned and the set having the smaller number of in-sequence column pairs are not to be aligned. For example, in FIG. 8, the tables 800 and 801 include two sets of columns associated for alignment, i.e., set 810 including column pairs B-B (804-805) and C-C (806-807) and set 811 including column pair A-A (802-803). Since set 810 includes more pairs of columns associated for alignment than does set 811, the rule set 136 may provide for alignment of the columns of set 810, while leaving the columns of set 811 unaligned.

However, the rule set 136 may identify a plurality of conditions other than the number of in-sequence column pairs, to be considered for determining which sets of column pairs are to be aligned. For example, the rule set 136 may attach particular significance to columns designated for or that are determined to include data having a number format. Numbers may be significant with respect to column alignment since numbers are often compared, e.g., to determine or discern the particular transaction amounts of a plurality of tables that are summed to a total amount shown in yet another table. To attach more significance to satisfaction of one condition than to satisfaction of another feature, the rule set 136 may assign different weights for each satisfied condition. For each alignment option, an overall score may be calculated by adding the different weights associated with the alignment option. According to this embodiment, the rule set 136 may provide that the columns of set 811 should be aligned at the expense of the non-alignment of the pairs of columns of set 810 if the columns 802 and 803 include data in a number format and none of the columns of the set 810 include data in the number format (or if none of the pairs of the set 810 includes two columns that each includes data in the number format). The rule set 136 may provide for alignment of the set of column pairs that includes the most columns including data in a number format. This is just one example of a condition that the rule set 136 may provide for determining which set of column pairs to align.

Figure 9:
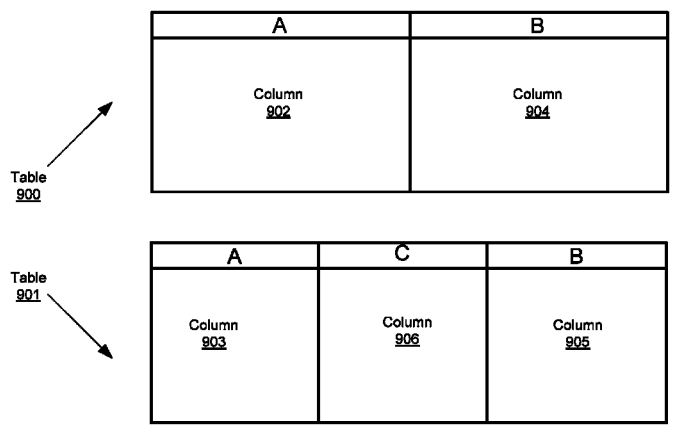
FIG. 9 illustrates alignment of pairs of corresponding columns having a different number of intermediary columns, according to an example embodiment of the present invention.

Even of those sets of inter-table column pairs that appear in a same sequence in each of the tables, it may occur that each table includes a different number of columns that are not associated for alignment with the other table and interspersed amongst the columns that are associated for alignment, than the set of the other table. For example, FIG. 9 shows a table 900 that includes columns 902 and 904 that are associated for alignment with columns 903 and 905, respectively, of table 901. However, while columns 902 and 904 are positioned next to each other without interruption, columns 903 and 905 are separated by column 906 which is not associated for alignment with any column of table 900.

In one example embodiment of the present invention, where two consecutive columns of a first table are associated for alignment with two non-consecutive columns of a second table that appear in the same order as that of the two consecutive columns of the first table, the system and method may provide for aligning either the first or the second of the two consecutive columns of the first table with the corresponding column of the second table, without aligning the other corresponding columns. The two aligned columns may be assigned the same column width.

According to an alternative example embodiment of the present invention, the system and method may provide for aligning both of the associated columns with each other, by aligning at least a portion of the corresponding columns to each other. For example, as shown in FIG. 9, the outer edges of each of the pairs of corresponding columns may be aligned. FIG. 10 shows alignment of the outer edges of such corresponding pairs of columns according to an alternative example embodiment of the present invention. In FIG. 10, a left one of the consecutive pair of columns, i.e., column 1002 of table 1000, is assigned a width so that it is fully aligned with corresponding column 1003 of table 1001, while the right one of the consecutive pair of columns, i.e., column 1004 of table 1000, is assigned a width such that its right edge is aligned with the right edge of corresponding column 1005 of table 1001 but its left edge is aligned with the left edge of the intermediary column 1006 of table 1001. In a variant of this embodiment, the right column of the column pair that does not include any intermediary columns may be fully aligned with its corresponding column and the left column of the column pair that does not include any intermediary columns may be aligned at its left edge with its corresponding column and at its right edge with the right edge of the intermediary of the table including the corresponding pair of columns. An exemplary implementation of this variant is described in detail above with respect to FIG. 6.

In one variant of this embodiment, the system and method may provide that at least one of the column pairs should not be aligned in certain instances. For example, the rule set 136 may provide that columns are to be assigned at least a minimum column width. The minimum may be absolute or may be relative to the space occupied by the data of the columns. The rule set 136 may further provide that a column width should not exceed a certain maximum width. The maximum may be absolute or may be relative to the space occupied by the data of the columns. For example, the rule set 136 may set a maximum for an amount of white space that may appear after a longest string of a column. According to this embodiment, the rule set 136 may provide for an alignment different than that shown in FIG. 9 if the alignment of FIG. 9 requires an assignment to either of columns 902 and 904 of a column width greater than the maximum allowed column width. In one variant, the maximums and minimums may be modified according to manual manipulation of the column sizes. For example, if a user manually stretches a column's width so that it exceeds its maximum width, the rule set 136 may provide for setting a new maximum width as some predetermined amount past the point to which the user manually extended the column's width. Accordingly, if the width required for the column to have a side aligned with a corresponding column of another table is within the predetermined amount past the manually extended edge of the column, the rule set 136 may provide for automatically further extending the column so that one of its edges is aligned with an edge of the corresponding column. Similarly, if the user manually minimizes a column width past its minimum, a new minimum may be set in order to align the corresponding columns. Even according to this embodiment, however, the rule set 136 may set overall absolute maximums and minimums that may trump the predetermined additional extending or narrowing of the columns.

In one variant of this embodiment, while the rule set 136 may provide for generally setting a column's width so that all of the data of most or all of the column's cells are displayed without scrolling within the cells, the rule set 136 may provide otherwise to minimize the widths of the non-consecutive columns towards their respective minimums so that the consecutive columns, e.g., extended towards their respective maximums, can be aligned at least at their outer edges with the non-consecutive columns.

It may occur that, even with the minimizing of the column widths of the non-consecutive columns to their respective minimums and the maximizing of the column widths of the consecutive columns to their respective maximums, none of the column edges of the corresponding columns of the different tables become aligned. Nevertheless, the rule set 136 may provide for the minimizing of the column widths of the non-consecutive columns to their respective minimums and the maximizing of the column widths of the consecutive columns to their respective maximums so that the corresponding columns may be aligned at least to the extent that portions of the corresponding columns overlap, e.g., as much as possible, as shown in FIG. 11. In FIG. 11, of corresponding columns A 1102 and 1103 of tables 1100 and 1101, only portions 1102.1 and 1103.1 overlap and none of the column edges of columns 1102 and 1103 are aligned. Similarly, of corresponding columns B 1104 and 1105 of tables 1100 and 1101, only portions 1104.1 and 1105.1 overlap and none of the column edges of columns 1104 and 1105 are aligned.

In an example embodiment of the present invention, if: (a) a first pair of columns of a first table correspond for alignment to a second pair of columns of a second table; (b) the corresponding columns of the first pair and the second pair are in the same sequence; and (c) the first and second pairs of columns include a different number (of at least one each) of intervening columns that are not aligned between the first and second tables, the system and method of the present invention may provide for fully aligning each of the columns of one pair with the respective corresponding columns of the other pair, i.e., the outer edges of each of the columns of one pair align with the outer edges of each of the respective corresponding columns of the other pair. FIG. 12 shows an example of pairs of corresponding columns of different tables having different numbers of intervening columns. In FIG. 12, column A 1202 of table 1200 corresponds to column A 1203 of table 1201, and column B 1204 of table 1200 corresponds to column B 1205 of table 1201. However, between columns 1202 and 1204 of table 1200 are two intervening columns 1206 and 1208 that do not correspond for alignment purposes with any columns of table 1201, and between columns 1203 and 1205 of table 1201 is only a single intervening column 1207 that does not correspond for alignment purposes with any column of table 1200. Thus, the number of intervening columns between columns 1202 and 1204 and between 1203 and 1205, respectively, differs. In this instance, columns A 1202-1203 and columns B 1204-1205, respectively, are shown to be fully aligned. For the full alignment, the widths of columns 1206 and 1208 may be minimized towards their respective minimums.

In one example embodiment of the present invention, the full alignment may be provided only so long as rules regarding the minimum and maximum column widths are adhered to with respect to the intervening columns. Furthermore, whether the full alignment is provided may be impacted by the extent to which the intervening columns correspond for alignment with columns of other tables besides for the first and second table.

Tables including corresponding columns may be structured such that, should all of the corresponding columns of the tables be fully aligned, a first column, e.g., following a column identifying the individual records with which the respective rows are associated, of one of the tables would begin after much white space measured from a left edge of the table. For example, the full alignment may require that the beginning of the first column appear in the display screen only after scrolling the display screen even where the left edge of the table is displayed near the left edge of the display area of GUI 112. This may occur, for example, where a first table includes a number of columns that do not correspond for alignment to any columns of a second table, the non-corresponding columns precede columns that do correspond for alignment to columns of the second table, and the first column of the second table corresponds for alignment to a column of the first table. For the alignment of the first column of the second table with the corresponding column of the first table, it may be required to position the first column of the second table so that it begins after white space corresponding to the space of the first table in which the number of non-corresponding columns are displayed.

In one example embodiment of the present invention, the rule set 136 may specify a maximum amount of white space that may precede a beginning of a first (in sequence) displayed column of a first table, e.g., a column displayed first after a column identifying the table records. For determining the amount of required white space, the first white space beginning from a left edge of the first table or beginning from a right edge of a column of the first table in which record identifiers are displayed may be considered the beginning of the white space. Accordingly, should alignment of a first column of a first table with a column of a second table require displaying a first edge, e.g., a left edge, of the first column after more than the specified maximum of white space, the rule set 136 may provide for displaying the first column without aligning it with the column of the second table. However, even if the left edge of the first column is not aligned with a left edge of the column of the second table, the rule set 136 may provide for extending the width of the first column so that at least the right edge of the first column aligns with a right edge of the column of the second table or so that at least a portion of the first column aligns with a portion of the column of the second table. However, if the rule set 136 specifies a maximum width for the first column and the first column does not at all align with the column of the second table even if extended to the maximum allowed width, the rule set 136 may provide for displaying the first column without extending it for alignment purposes. In one variant, however, the first column may be extended towards or to the maximum allowed width if such extension allows another column of the first table to be aligned, e.g., fully, with a corresponding column of the second or another table.

For example, in FIG. 13, column A 1303 of table 1301 may correspond for alignment to column A 1302 of table 1300. However, alignment of columns A 1302-1303, even to the extent that only portions of the corresponding columns overlap without alignment of any edges, may require displaying a left edge of column A 1303 after a significant amount of white space that exceeds a specified maximum since column A 1303 is a first column of table 1301 and column A 1302 is displayed after columns C 1306 and D 1308 of table 1300. Accordingly, the rule set 136 may provide that the columns 1303 and 1302 should not be aligned. Portion 1303.1 of column 1303 represents a width that would be assigned to column 1303 if only contents of column 1303 are considered. Nevertheless, the rule set 136 may provide that column 1303 should be extended, towards or to its maximum allowed width to include portion 1303.2 so that columns B 1304-1305 may be fully aligned.

In an example embodiment of the present invention, a display area required for display of all of the columns of all of the tables may be larger than that which can be simultaneously displayed in the display area of the GUI 112. For example, the required display area may depend on font size, set column widths, and a number of columns to be provided in a table. Accordingly, after all of the column positions are determined, a required scrolling extension to the display area may be determined.

In one example embodiment of the present invention, where a scrolling area is provided, the system and method may set all columns of a table, but for a first column identifying records, to scroll. The first column identifying records may remain stationary so that it is always displayed even when scrolling to view columns to the right. For example, the columns scrolling left when scrolling to view columns to the right may appear to be scrolling into a position underneath the first column.

In an example embodiment of the present invention, subsequent to an arrangement of two (or more) columns of different tables according to a stored setting of an association between the two columns, where the columns are fully aligned, the system and method may provide that, if a user manually shifts an edge of a column of a first one of the tables, then the corresponding edge of a corresponding column of a second one of the tables is automatically shifted in a corresponding manner. In one variant, the corresponding shift of the column of the second table may be performed conditional upon maintaining other realized alignments between the columns of the second and the first table and/or the columns of the second and other tables, where the other realized alignments are in accordance with stored associations between the aligned columns. Whether the other alignments can be maintained may depend, for example, on the rules regarding maximum and minimum widths, maximum white space, and/or other rules of the rule set 136. In one variant, as long as at least partial alignment between the other columns can be maintained, the system and method may automatically shift the edge of the column of the second table in accordance with the manual shift of the edge of the column of the first table. In one variant, the system and method may shift one or more edges of the column of the second table in accordance with the manual shift of the column of the first table only to an extent required to maintain at least partial alignment between the two columns. In particular, this variant may be implemented in a case where the shift of the column of the second table to maintain full alignment between the two columns causes a loss of full or at least partial alignment between other columns.

In one example embodiment of the present invention, the system and method may perform the method described with respect to FIG. 7 each time an instruction to modify the display of the tables is received. For example, the method may be performed each time an indicator 202 is selected indicating to either expand or collapse a record, or each time input for manual manipulation of column edges is received. In an alternative example embodiment of the present invention, after a first display of tables according to the method described with respect to FIG. 7, the system and method may adjust the previous table display according to the newly received instructions.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented method for displaying hierarchically related data, comprising:
   simultaneously displaying, by a computer processor in a display window, respective representations of a plurality of hierarchically related data records in accordance with the hierarchical relationship;
   wherein:
      each of at least two of the representations includes a respective table, the respective table including:
         a respective plurality of data columns;
         a respective column header row that includes column headers identifying a respective plurality of categories to which the data columns correspond; and
         one or more respective additional rows including data indicated to be associated with the categories of the respective column header row of the table to which the plurality of additional rows belongs by display of the data beneath the column headers of the respective column header row;
      the at least two representations' represented data records depend from a common ancestor data record;
      the respective tables are displayed (a) nested in another table representing the ancestor data record, and (b) such that the respective tables span columns of the another table with which data of the respective tables are unassociated;
      the another table representing the ancestor record includes a single column header row, displayed simultaneously with the column header row of at least one of the at least two representations, and that includes column headers identifying a respective plurality of categories to which the columns of the another table correspond;
      the another table includes a data row that (a) includes data populating fields formed by an intersection of the data row of the another table with the columns of the another table and (b) is displayed below the at least one of the at least two representations; and
      the single column header row is displayed above the tables of the at least two representations and is not repeated below any of the at least two representations.

2. The method of claim 1, wherein the respective tables differ from each other with respect to at least one of a number of included columns, data categories represented by respective columns, data types included in respective columns, and an order in which respective columns are arranged.

3. The method of claim 1, wherein a displayed representation includes a plurality of tables, each table including data records of a hierarchical level that is one lower than that of the data record represented by the displayed representation.

4. The method of claim 1, further comprising:
displaying, for each of at least one of the hierarchically related data records, a control to toggle between an expanded and collapsed view of the respective one of the respective data records;
wherein:
when the expanded view is active, a table including child data records of the respective data record is displayed; and
when the collapsed view is active, the table is not displayed.

5. The method of claim 1, wherein the columns of the another table correspond to respective data categories, such that inclusion of data within the respective columns indicates an association of the included data with the respective data categories, and the respective tables do not include data belonging to the respective data categories.

6. The method of claim 1, wherein the columns of the another table correspond to respective data categories, such that inclusion of data within the respective columns indicates an association of the included data with the respective data categories, and the display of the respective tables does not indicate an association of data of the respective tables with the respective data categories.

7. The method of claim 1, wherein the respective tables are displayed such that each of the respective tables spans multiple columns of the another table.

8. The method of claim 1, wherein the another table is displayed in a frame and each of the at least two representations is displayed in a respective frame that is offset from the frame of the another table and that graphically separates the at least two representations from the another table.

9. A computer-implemented method for displaying hierarchically related data, comprising:
simultaneously displaying, by a computer processor and in a display window, respective representations of a plurality of hierarchically related data records in accordance with the hierarchical relationship, wherein:
each of at least two of the representations includes a respective table, the respective table including:
a respective plurality of data columns;
a respective column header row that includes column headers identifying a respective plurality of categories to which the data columns correspond; and
one or more respective additional rows including data indicated to be associated with the categories of the respective column header row of the table to which the plurality of additional rows belongs by display of the data beneath the column headers of the respective column header row;
the at least two representations' represented data records depend from a common ancestor data record; and
the respective tables are displayed (a) nested in another table representing the ancestor data record, and (b) such that the respective tables span columns of the another table with which data of the respective tables are unassociated; and
modifying a setting of a display attribute of a first column of a first one of the respective tables from a first setting to a second setting based on modification of a setting of a display attribute of a first column of a second one of the respective tables based on a stored rule that provides for at least a portion of the first column of the first one of the respective tables and a portion of the first column of the second one of the respective tables to be vertically aligned, one beneath the other, when displayed in the displaying step, wherein a column arrangement of the first one of the respective tables is different than a column arrangement of the second one of the respective tables.

10. The method of claim 9, wherein the display attribute of the first column includes at least one of a size and a display position.

11. The method of claim 9, further comprising:
determining that the first column of the first one of the respective tables corresponds for alignment to the first column of the second table;
wherein:
the correspondence is determined based on one of: (a) a similarity of a data type between content of the first column of the first one of the respective tables and the first column of the second one of the respective tables, (b) a link between the first column of the first one of the respective tables and the first column of the second one of the respective tables set in accordance with a user input instruction, and (c) a shared column ID between the first column of the first one of the respective tables and the first column of the second one of the respective tables; and
the setting of the display attribute of the first column of the first one of the respective tables based on the display attribute of the first column of the second one of the respective tables is performed conditional upon the determining that the first column of the first one of the respective tables corresponds for alignment to the first column of the second table.

12. A non-transitive computer-readable medium having stored thereon instructions adapted to be executed by a processor, the instructions which, when executed, cause the processor to perform a method for displaying hierarchically related data, the method comprising:
simultaneously displaying in a display window respective representations of a plurality of hierarchically related data records in accordance with the hierarchical relationship;
wherein:
each of at least two of the representations includes a respective table, the respective table including:
a respective plurality of data columns;
a respective column header row that includes column headers identifying a respective plurality of categories to which the data columns correspond; and
one or more respective additional rows including data indicated to be associated with the categories of the respective column header row of the table to which the plurality of additional rows belongs by display of the data beneath the column headers of the respective column header row;
the at least two representations' represented data records depend from a common ancestor data record;
the respective tables are displayed (a) nested in another table representing the ancestor data record, and (b) such that the respective tables span columns of the another table with which data of the respective tables are unassociated;
the another table representing the ancestor record includes a single column header row, displayed simultaneously with the column header row of at least one of the at least two representations, and that includes column headers identifying a respective plurality of categories to which the columns of the another table correspond;
the another table includes a data row that (a) includes data populating fields formed by an intersection of the data row of the another table with the columns of the another table and (b) is displayed below the at least one of the at least two representations; and the single column header row is displayed above the tables of the at least two representations and is not repeated below any of the at least two representations.

13. A system for displaying hierarchically related data, comprising:
a display device; and
a processor configured to:
display in a display window of the display device respective representations of a plurality of hierarchically related data records in accordance with the hierarchical relationship;
wherein:
each of at least two of the representations includes a respective table, the respective table including:
a respective plurality of data columns;
a respective column header row that includes column headers identifying a respective plurality of categories to which the data columns correspond; and
one or more respective additional rows including data indicated to be associated with the categories of the respective column header row of the table to which the plurality of additional rows belongs by display of the data beneath the column headers of the respective column header row;
the at least two representations' represented data records depend from a common ancestor data record;
the respective tables are displayed nested in another table representing the ancestor data record, and are not arranged within any common row of the another table;
the another table representing the ancestor record includes a single column header row, displayed simultaneously with the column header row of at least one of the at least two representations, and that includes column headers identifying a respective plurality of categories to which the columns of the another table correspond;
the another table includes a data row that (a) includes data populating fields formed by an intersection of the data row of the another table with the columns of the another table and (b) is displayed below the at least one of the at least two representations; and
the single column header row is displayed above the tables of the at least two representations and is not repeated below any of the at least two representations.

14. The system of claim 13, wherein the respective tables differ from each other with respect to at least one of a number of included columns, data categories represented by respective columns, data types included in respective columns, and an order in which respective columns are arranged.

15. The system of claim 13, wherein a displayed representation includes a plurality of tables, each table including data records of a hierarchical level that is one lower than that of the data record represented by the displayed representation.

16. The system of claim 13, wherein:
the processor is configured to display, for each of at least one of the hierarchically related data records, a control to toggle between an expanded and collapsed view of the respective one of the respective data records;
when the expanded view is active, a table including child data records of the respective data record is displayed; and
when the collapsed view is active, the table is not displayed.

17. A system for displaying hierarchically related data, comprising:
a display device; and
a processor configured to:
display in a display window of the display device respective representations of a plurality of hierarchically related data records in accordance with the hierarchical relationship, wherein:
each of at least two of the representations includes a respective table, the respective table including:
a respective plurality of data columns;
a respective column header row that includes column headers identifying a respective plurality of categories to which the data columns correspond; and
one or more respective additional rows including data indicated to be associated with the categories of the respective column header row of the table to which the plurality of additional rows belongs by display of the data beneath the column headers of the respective column header row;
the at least two representations' represented data records depend from a common ancestor data record; and
the respective tables are displayed nested in another table representing the ancestor data record, and are not arranged within any common row of the another table; and
set a display attribute of a first column of a first one of the respective tables based on a display attribute of a first column of a second one of the respective tables so that at least a portion of the first column of the first one of the respective tables and a portion of the first column of the second one of the respective tables are vertically aligned, one beneath the other, when displayed in the display window, wherein a column arrangement of the first one of the respective tables is different than a column arrangement of the second one of the respective tables.

18. The system of claim 17, wherein the display attribute of the first column includes at least one of a size and a display position.

19. The system of claim 17, wherein:
the processor is configured to determine that the first column of the first one of the respective tables corresponds for alignment to the first column of the second table;
the correspondence is determined based on one of: (a) a similarity of a data type between content of the first column of the first one of the respective tables and the first column of the second one of the respective tables, (b) a link between the first column of the first one of the respective tables and the first column of the second one of the respective tables set in accordance with a user input instruction, and (c) a shared column ID between the first column of the first one of the respective tables and the first column of the second one of the respective tables; and
the setting of the display attribute of the first column of the first one of the respective tables based on the display attribute of the first column of the second one of the respective tables is performed conditional upon the processor determining that the first column of the first one of the respective tables corresponds for alignment to the first column of the second table.

20. A computer-implemented method comprising:
providing, b a computer processor, data for transmission, the data including instructions adapted to be executed by a processor, the instructions which, when executed, cause the processor to perform a method for displaying hierarchically related data, the method for displaying comprising:

simultaneously displaying in a display window respective representations of a plurality of hierarchically related data records in accordance with the hierarchical relationship;

wherein:

each of at least two of the representations includes a respective table, the respective table including:
a respective plurality of data columns;
a respective column header row that includes column headers identifying a respective plurality of categories to which the data columns correspond; and
one or more respective additional rows including data indicated to be associated with the categories of the respective column header row of the table to which the plurality of additional rows belongs by display of the data beneath the column headers of the respective column header row;

the at least two representations' represented data records depend from a common ancestor data record;

the respective tables are displayed (a) nested in another table representing the ancestor data record, and (b) such that the respective tables span columns of the another table with which data of the respective tables are unassociated;

the another table representing the ancestor record includes a single column header row, displayed simultaneously with the column header row of at least one of the at least two representations, and that includes column headers identifying a respective plurality of categories to which the columns of the another table correspond;

the another table includes a data row that (a) includes data populating fields formed by an intersection of the data row of the another table with the columns of the another table and (b) is displayed below the at least one of the at least two representations; and the single column header row is displayed above the tables of the at least two representations and is not repeated below any of the at least two representations.

* * * * *